United States Patent

[11] 3,614,722

| [72] | Inventor | Charles H. Jones<br>Murrysville, Pa. |
|------|----------|-------------------------------------|
| [21] | Appl. No. | 505,444 |
| [22] | Filed | Oct. 27, 1965 |
| [45] | Patented | Oct. 19, 1971 |
| [73] | Assignee | Westinghouse Electric Corporation<br>Pittsburgh, Pa. |

[54] SIGNAL-PROCESSING APPARATUS AND METHOD
9 Claims, 7 Drawing Figs.

[52] U.S. Cl. .................................................. 340/6 R,
340/6 M, 343/100 SA
[51] Int. Cl. .................................................. G01s 3/00
[50] Field of Search ............................................ 340/3 PR, 3
R, 6, 6 M, 16, 15.5; 343/100.6, 113

[56] References Cited
UNITED STATES PATENTS

| 2,825,043 | 2/1958 | Abbott .......................... | 340/16 |
| 3,039,079 | 6/1962 | Walters et al. .................. | 340/6 |

FOREIGN PATENTS

| 704,700 | 4/1941 | Germany ..................... | 340/16 |

Primary Examiner—Richard A. Farley
Attorneys—P. H. Henson, E. P. Klipfel and D. Schron ABSTRACT: A plurality of recording heads records, on a magnetic medium, the signals derived from a corresponding plurality of transducers arranged in an array. Each recording head records a respective transducer signal on a separate track of the recording medium which is movable relative to the recording heads and relative to a readout means. The readout means comprises a plurality of linear transducers each of which extends across all of the recording tracks. The orientation of each linear transducer is greater than 0° with respect to movement of the recording medium and each linear transducer is at an angle with respect to one another. The signal provided by each linear transducer accordingly represents energy impinging upon the transducer array from a specified direction dependent upon the orientation of the linear transducer means. A scanning function is simulated by a rotation of the linear transducer means.

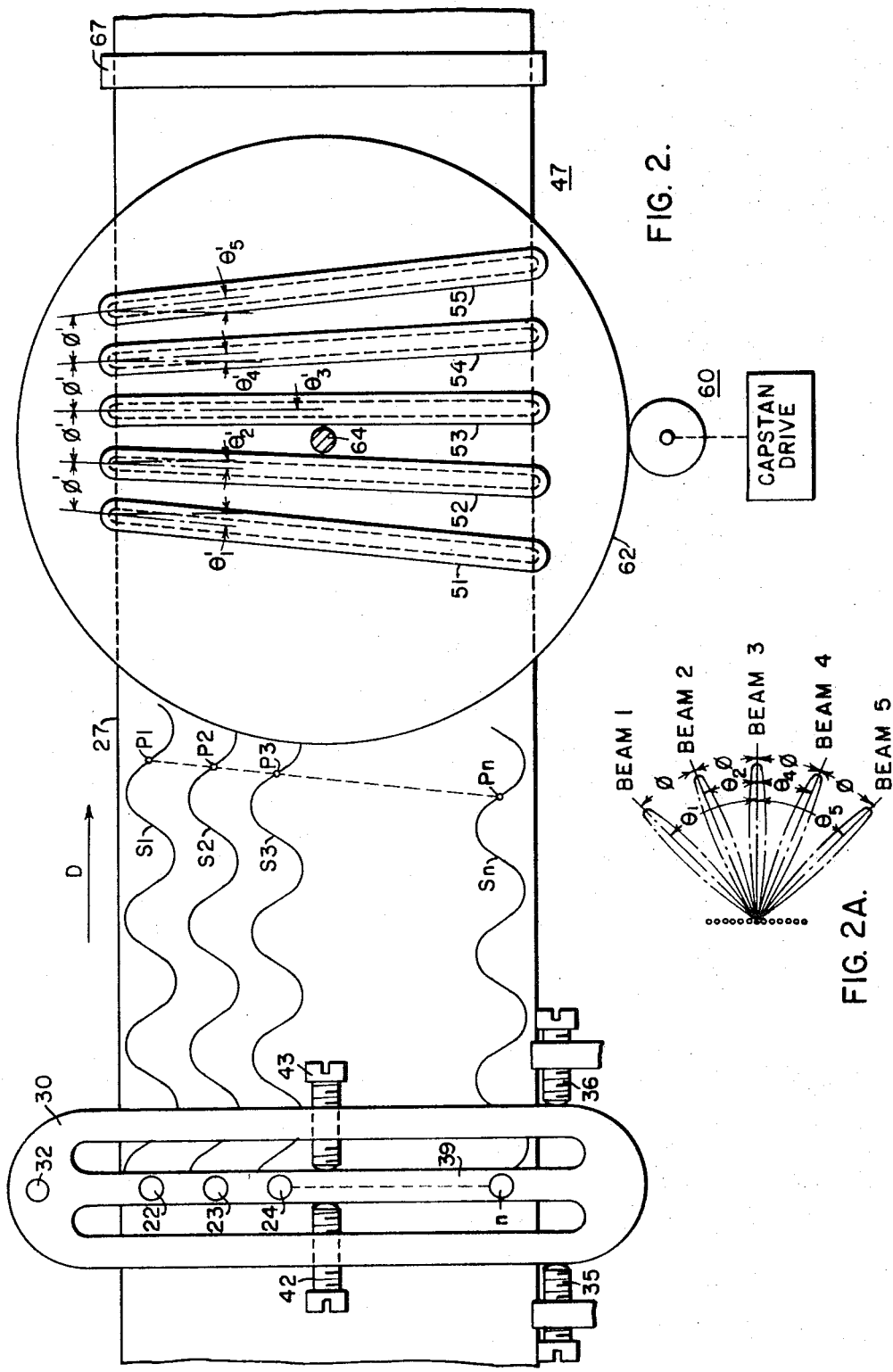

SIGNAL-PROCESSING APPARATUS AND METHOD

This invention in general relates to signal processing, and more particularly to the processing of signals sent or received by an array of individual elements for beam forming.

In beam-forming and beam-steering sonar systems, a plurality of transducers is utilized in a predetermined array with the array being oriented so that incoming acoustic energy is capable of either impinging upon all of the transducers at the same time, whereupon each transducer will provide the same signal simultaneously or impinging upon the transducers at different times, depending upon the incoming angle, whereupon the transducers will produce corresponding signals sequentially. In order to determine from which direction or directions the incoming acoustic energy is coming one or more beams is "formed" and if the beam receives acoustic energy, then it is known that the energy is coming from a certain angle since the angle of the beam is known. Conversely, energy may be transmitted at various angles.

In order to form beams at various angles, it is necessary to employ a phasing unit employing a separate delay line for each transducer. A common type of delay line is the inductance-capacitance transmission line analog-type delay line. In addition to the delay line for the transducer it would be necessary to provide a plurality of taps on each line so that the beams that are formed can be scanned in discrete steps over predetermined angles. Not only would a large number of taps be required for this scheme but a rather complex switching arrangement would be necessary to accomplish tap changing. In addition, the inductance-capacitance delay line has a limited bandwidth and the delay period through the passband does not remain constant as a functioning of frequency. For large arrays operating at low frequencies and with long delays, the components become extremely large, heavy and expensive.

It is, therefore, one object of the present invention to provide an improved signal-processing arrangement for use with an array of transducers, which arrangement eliminates the need for large and bulky delay lines.

Another object is to provide a signal-processing arrangement of relatively simple construction and capable of forming a plurality of beams.

Another object is to provide signal-processing equipment which not only forms a plurality of beams but also is capable of scanning these beams through predetermined angles.

Another object is to provide an improved method for processing signals received from a plurality of transducers in an array in order to form receiving beams.

Another type of signal processing scheme for use with a transducer array utilizes a digital system to simulate a delay line. In this scheme, the signals from the the transducers of the array are clipped to a square wave and the polarity information is used to determine a binary state which travels through a digital shift register. In this system there is very often a loss of information because of the clipping action employed an therefore the signal-to-noise ration is degraded. In addition, the clipping action can produce an effect which results in target or bearing errors and for some applications, doppler information is degraded somewhat.

It is, therefore, another object of the present invention to provide an improved signal-processing arrangement which eliminates these deficiencies.

Briefly, in accordance with the above objects, the apparatus of the present invention employs a storage medium such as a belt of magnetic tape for recording signals provided by the receivers of an array, the receivers being transducers. A plurality of transducers in the form of recording heads is provided, each for receiving the signal from an associated transducer and recording the signal on a separate track of the magnetic tape. The recording heads have a 1:1 correspondence with the transducers of the array not only in number but also in direction and orientation. Means are therefore provided for tilting and curving the arrangement of recording heads to correspond to a tilting and/or curving of the transducer array.

Readout means are provided for reading out the signals on all of the recording tracks for obtaining a single output signal. Preferably, the readout means comprises a plurality of transducers in the form of elongated readout heads each being at an angle relative to each other, the angle being proportional to desired beam separation. Since each recording head extends the width of the track for obtaining a single signal from all of the signal tracks, a group of delay lines are simulated.

In order to scan the various beams that are formed, the readout heads are made pivotably movable with respect to the magnetic tape or the recording heads so that they may move angularly with respect thereto.

In addition to receiving beams, the apparatus is operable to form sending beams by reversing the roles of the readout means and the recording heads.

The above-stated as well as further objects, advantages and uses of the present invention will become apparent upon a reading of the following detailed specification taken in conjunction with the drawings, in which:

FIG. 2 illustrates a plan view of an embodiment of the present invention;

FIG. 2A illustrates the beams formed by the apparatus of FIG. 2;

Figure 1A:
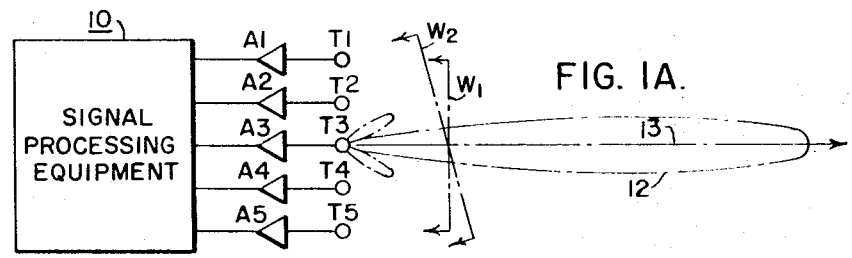
FIG. 1A, 1B and 1C are schematic illustrations to aid in an understanding of beam forming.
Figure 1B:
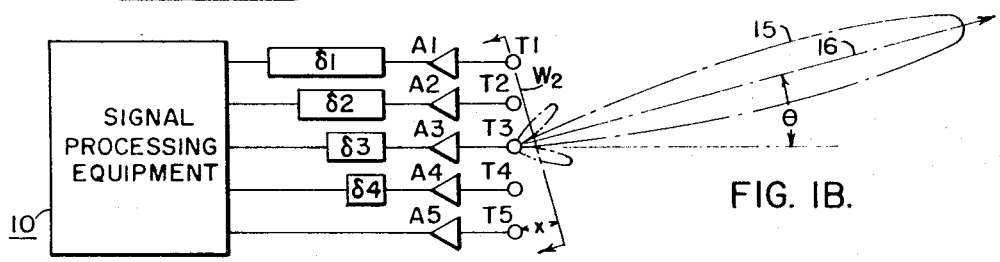
Figure 1C:
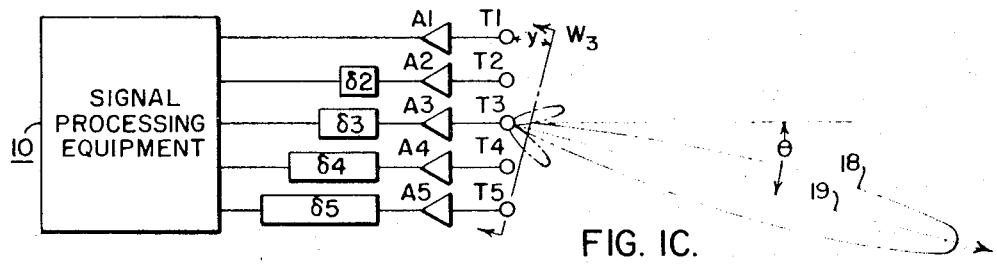

FIGS. 1A, 1B and 1C serve to explain the manner in which a beam is formed, and by way of example, the operation will be described with respect to a receiving beam for acoustic energy. In FIG. 1A, there is illustrated an array of transducers of which five are shown, T1 through T5, in a vertical array. When utilized to detect incoming acoustic energy, the transducers T1 through T5 are also known as hydrophones. The signal provided by each of the transducers T1 through T5 in response to incoming acoustic energy may be amplified in respective amplifiers A1 through A5 after which the signals are summed and processed in the signal-processing equipment 10.

In FIG. 1A, incoming acoustic energy from a distant source is represented by the vertical wavefront labeled $W_1$ traveling in the direction indicated by the arrows. The wavefront $W_1$ will strike each of the transducers T1 through T5 at the same time whereupon each will produce a corresponding signal at the same time. Assuming that the incoming acoustic signal is sinusoidal, each transducer will then provide an output sine wave with all of the sine waves being of the same amplitude and all being in phase. These signals are then combined, that is, summed in the signal-processing equipment 10 and since all of the signals are in phase they will all add to give a relatively large-summed signal representative of the horizontal acoustic signal impinging upon the transducer array. In FIG. 1A, therefore, the transducer array has a receiving beam pattern schematically illustrated at 12, having a beam axis 13 pointing in the horizontal. In actuality, the beam pattern is simply a polar plot of relative intensities which can be received by the array.

Actually, the beam 12 extends 360° around the vertical array and the schematic illustration of FIG. 1 would represent a section through the beam. The beam pattern therefore could be described as a "flattened doughnut."

Energy from directions other than the horizontal will not arrive at all of the elements in phase and so the sum will be of reduced amplitude.

In the arrangement of FIG. 1A, the beam axis 13 is at an angle of 0° with respect to the horizontal and therefore the transducer array will have substantially no response to acoustic signals coming in at other angles. By way of example in FIG. 1A, suppose that a second acoustic signal is represented by the wavefront $W_2$. The wavefront traveling in the direction indicated first inpinges upon transducer T1 whereupon a corresponding signal is fed to the signal-processing equipment where it is summed with the output of the other transducers. Since signal intensities would be the same along the wavefront, the same signal that was produced by transducer T1 will be provided by transducer T2 a short time thereafter. Similarly, as the wave travels the subsequent transducers will provide the same signal sequentially. Therefore, it is seen that the signals provided by the transducer array in response to an acoustic signal at a different angle than $W_1$ will be out of phase with one another and therefore, at any instant of time, the signals will have different amplitudes. The summation of these signals not only will be substantially less than the previous case described but in some instances may even be zero. In order to detect acoustic energy from the direction represented by $W_2$, the arrangement of FIG. 1B may be utilized.

In FIG. 1B, when the signal $W_2$ impinges upon transducer T1, it is still a distance $x$ away from transducer T5 due to the incoming angle. If the signal provided by transducer T1 therefore can be delayed by an amount of time it takes for the signal to travel the distance $x$ then the signals provided by transducers T1 and T5 will arrive at the summing networks of the signal-processing equipment 10 at the same time. This is accomplished by the insertion of a delay line designated δ1. In a similar fashion, delays 2, 3 and **4 are inserted in the lines of the transudcers T2, T3 and T4, respectively, for delaying the signals provided therefrom a proportionally smaller amount so that all of the signals provided by transducers T1 through T5 are in phase when they are summed and processed. The summed signal represents the acoustic energy received by beam 15 having a beam axis 16 at an angle $\theta$ with respect to the horizontal.

Since this elevation angle $\theta$ is the same for all azimuth angles the three-dimensional pattern is obtained by rotating the pattern 15 about a vertical axis through the origin 0 of the polar coordinate system. Hence the three dimensional pattern has a conical shape.

In FIG. 1C, the acoustic signal represented by the wavefront $W_3$ impinges first upon transducer T5 and after a distance of travel labeled $y$, impinges upon transducer T1. In an arrangement analogous to that of FIG. 1B, the signal provided by transducer T5 of FIG. 1C is delayed by delay line δ5 for an amount of time equal to the time it takes for the wavefront to travel the distance $y$. Proportionally smaller delay lines δ4, δ3 and δ2 are inserted in the line containing transducers T4, T3 and T2, respectively, so that all of the transducer signals are in phase when they are summed. In essence, the beam 18 is formed having a beam axis 19 at an angle of $\theta$ negative with respect to the horizontal. If the arrangements of FIGS. 1A, 1B and 1C are combined and each delay line is provided with a number of taps, it is apparent that the resulting arrangement would be one in which a plurality of beams is formed. If it is desired to vertically scan, that is, move the beams it would be necessary to provide complex tap-changing equipment. It would be necessary in the actual design to use heavy, bulky and expensive equipment to achieve the necessary delays. The present invention eliminates these drawbacks and to this end reference is now made to FIG. 2.

In FIG. 2, there is illustrated a plurality of recording heads 22,23,24...n, each for recording the signal provided by an individual transducer of an array, such as illustrated in FIG. 1A, on a separate track of a recording medium illustrated as magnetic tape 27. The spacing between the recording heads is made proportional to the spacing between the transducers of the array.

In application where the array elements are located on a cable which is suspended in water, motion of the water with respect to the cable support may cause the array to assume some angle with respect to vertical and also to curve a small amount. These effects can be compensated for in the signal processor by tilting and curving the writing head array. This is shown schematically in FIG. 2. Member 30 which carries the recording heads is pivotally mounted at point 32. Located at the other end of member 30 are two adjusting screws 35 and 36 which can adjust the relative pivotal movement of member 30 about point 32 to thereby give the recording heads a different angular orientation with respect to the direction of tape movement, represented by the arrow D, to correct for the angular orientation of the transducer array.

In addition to the nonvertical orientation, the transducer array is also capable of being nonlinear. That is, in operation, various forces acting on the transducers of the array may cause the array to curve. In FIG. 2, means are provided to curve the array of recording heads to simulate the array of transducers. This is accomplished by mounting the recording heads 22, 23, 24...n on a flexible leg 39, the curvature of which may be varied by adjusting screws 42 and 43. Each of the transducers 22, 23, 24...n records the signal provided by a corresponding transducer, onto a separate track of the magnetic tape 27. These signals are diagrammatically illustrated as S1, S2, S3...Sn and represents, for example, the incoming acoustic signal $W_2$ of FIG. 1A. Since this acoustic signal comes in at an angle with respect to the transducer array, the individual transducers will provide signals which are out of phase with one another and it is seen that a line drawn through corresponding points P1, P2 and P3 of signals S1, S2 and S3 is at a certain angle with respect to the direction of tape movement.

In order to utilize and interpret the signals recorded by the recordiing heads in the separate tracks of the magnetic tape 27, there is provided readout means 47 which includes a plurality of read-heads 51 through 55 each extending across the width of the tape for picking up the signals in all of the tracks. By way of illustration, read-head 51 is illustrated as being at a certain angular orientation designated $\theta'_1$. If this angular orientation is the same as the line passing through points P1, P2 and P3 of signals S1, S2 and S3 read-head 51 will then be reading the in-phase condition of the signals and will provide an output signal which is the sum of the signals on all of the tracks. The output signal provided by the read-head 51 will be the maximum signal provided by all of the read-heads. Read-heads 52 through 55 being at a different angular orientation, will add the signals in all of the tracks in various out-of-phase conditions and the output signals therefrom will be substantially less than that provided by read-head 51. Suppose that the signals designated S1 through Sn are provided by an acoustic signal which arrives at an angle of $\theta_1$ as illustrated in FIG. 2A. Since the read-head 51 reads the in-phase condition of these signals S1 through Sn, it then is the equivalent of receiving beam O1 oriented at the angle $\theta_1$ of FIG. 2A. In a similar fashion, read-head 52 oriented at an angle of $\theta'_2$ corresponds to beam O2 which is at an angle of $\theta_2$. Similarly, read-heads 53, 54 and 55 at an orientation of $\theta'_3$, $\theta'_4$ and $\theta'_5$ correspond to the horizontal beam O3 at an andle of $\theta_3=0°$, beam O4 at an angle of $\theta_4$ and beam O5 at an angle of $\theta_5$ respectively of FIG. 2A.

It may be mathematically demonstrated that for angles of $\theta$ and $\theta'$ below approximately 30° the angular orientation $\theta$ of a read-head is approximately proportional to its corresponding beam angle $\theta$. That is, $\theta=K\theta'$, where $\theta$ is the beam angle, $\theta'$ is the read-head angle, and K is a pproportionality constant and is a function in the medium in which the incoming acoustic energy travels.

Each of the beams are separated by an angle $\Phi$ from one another. This angle $\Phi$ is proportional to the angle $\Phi'$ of FIG. 2 and is indicative of the beam separation. From FIG. 2A it is seen that the read-heads of FIG. 2 will supply information relative to acoustic energy coming in at an angle of $\theta_1$, $\theta_2$, 0°, $\theta_4$ and $\theta_5$ degrees. In many instances, it would be desirable to tetect the acoustic energy which comes inbetween the beams. This can be accomplished by adding more read-heads between the ones illustrated in FIG. 2. Alternatively, the addition of extra read-heads between those shown may be effectively simulated. This is accomplished by the provision of rotating mechanism 60 which is operable to rotate the disk member 62, and consequently the read-heads 51 to 55, about pivot point 64. The amount of angular rotation may be relatively small and may be in the order of Φ'. The rotation of the read-heads relative to the signal tracks effects a scanning action of beams 1 through 5 (FIG. 2A).

With the beam arrangement of FIG. 2A and the signals S1 through Sn of FIG. 2 being provided, only beam 01 will have a large output signal since it was originally assumed that the signals S1 through Sn were caused by acoustic energy coming in at an angle $\theta_1$. In some applications, acoustic energy of a number of frequencies may be impinging upon the transducer array from various angles simultaneously so that the signals S1 through Sn would be somewhat more complex; however, each read-head will provide information relative to the acoustic energy entering at its associated angle. It should be noted that the apparatus is broadband since the tape is capable of recording a wide range of frequencies. Also the device can handle a wide range of signal amplitudes because of the large dynamic range of the recording tape and magnetic heads.

The signals recorded by the record heads 22, 23, 24 ...n all rach the read-head 53 at the same time since the read-head 53 is parallel to the record head array. The travel time for these signals from the record heads to any read-head other than 53 will be different for all signal tracks due to the angular orientation of the read-heads relative to the record head array. These different distances of travel to a readout head represents a delay which has the effect of forming the beam whose direction is determined by the angle of the readout head relative to the record head array. Another method therefore of changing the angular orientation of the beams or affecting a scanning of the beams is to change the angular orientation of the recording head array. This may be accomplished by suitable means (not shown) for effecting an oscillatory pivotal movement of member 30 about point 32.

Each of the read-heads 51 to 55 of FIG. 2 is illustrated as one long read-head extending the width of the track for reading out the signals in all of the tracks simultaneously. This may also be accomplished by replacing each read-head with a plurality of read-heads, each for an individual track and then combining, that is, summing, the signals from each individual read-head.

If it is desired to store the signals for future reference, the magnetic tape 27 may be in spools. For applications where it is not required to have the signals for future use, the magnetic tape 27 may advantageously be an endless loop. With an endless loop configuration, an erase head 67 is provided to erase all of the signals in all of the tracks before the tape again passes under the recording heads.

The signal-processing device for beam forming can be used for transmitting as well as receiving applications. By way of example assume that five conical beams having the shape illustrated in FIG. 2A were to be simultaneously transmitted each at a different frequency or group of frequencies and all of these scanned simultaneously through an angle Φ. A tape processor of the sort shown in FIG. 2 would be employed in which the frequencies associated with beams 01, 2, 3, 4 and 5 respectively would be fed to magnetic heads 51, 52, 53, 54 and 55. The signals read out at heads 22, 23, 24, ...n would each be amplified and fed to corresponding elements of a linear array of transducers which would form the desired beams 01, 2, 3, 4 and 5. Thus it is seen that the magnetic heads 22, 23, 24 ...n, and 51 through 55 are each capable of signal transfer, that is writing or reading information on the tracks of the magnetic tape 27. For forming a sending or transmitting beam, the roles of the writing heads 22, 23, 24 ... n and readout means 47 are interchanged.

Figure 3:
FIG. 3 illustrates a plan view of two receiving transducer arrays and a sound source array for geological-surveying applications of the present invention.
Figure 3A:
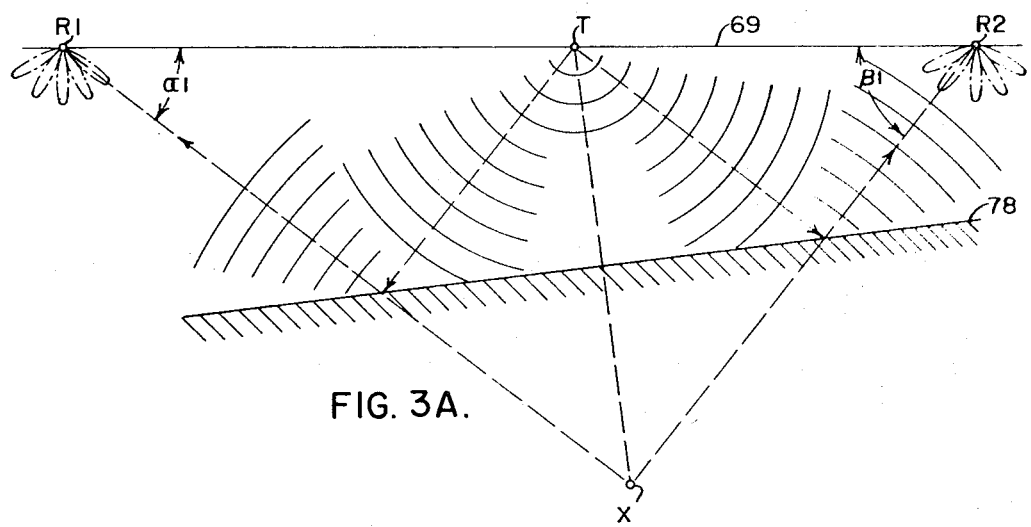
FIG. 3A is a diagrammatic view depicting the method by which the present invention may be used in geological surveying.

The present apparatus for beam forming and scanning finds particular application in the field of geological surveying and to this end reference should now be made to FIGS. 3 and 3A.

FIGS. 3 and 3A schematically demonstrate the method of obtaining an indication of various strata beneath the surface of the earth designated 69. A transmitter array is located at point T and two receiver arrays are located at points R1 and R2, respectively. These arrays are shown in plan view in FIG. 3 wherein there is shown the transmitter array 70 producing the narrow beam acoustic signal 71. This signal may be provided by a long array of transducers, explosives, or the like. The first and second receiving arrays 73 and 74 comprise a plurality of transducers perpendicular to the transmitter array with the output from each transducer going to separate recording heads as illustrated in FIG. 2. The various receiving beams formed are illustrated in FIG. 3A as emanating form points Ra and R2. Sound waves from the transmitter at point T propagate through the soil, reflect from a layer 78 and at some time later the receiving means at R1 detects an acoustic signal coming in an an angle of α1 and the receiving means at R2 detects a sound wave coming in at an angle of β1. For somplicity, only the reflection from the top surface 78 of a stratum will be considered although the principles herein are equally applicable to the bottom surface thereof as well as other strata. With the arrival angle at point R1 and at point R2 known, the top surface 78 of a geological stratum may be determined. This may be accomplished by drawing a line representing the distance between points R1 and R2 to a much smaller scale. One line is drawn to point R1 at an arrival angle of α1 and another line is drawn to point R2 at an arrival angle of β1. These two lines are extended till they meet at point X. A line is drawn from point X to point T and the perepndicular bisector of the line point X to T represents the top surface 78 of a stratum. FIG. 3A therefore serves the dual purpose of schematically illustrating both what is happening and the actual determination of stratum as a result of known arrival angles. This same general principle is followed to find the depth of the geological stratum in addition to other strata. With the distance between R1, T and R2 known, it is a matter of simple geometry to obtain the depth below the surface of the stratum. FIGS. 3 and 3A illustrate one method for obtaining geological information; obviously, other arrangements utilizing the arrival angle of acoustic energy are suggested. For example, one receiver array can be used with one transmitter with a reversal of position after a first arrival angle is obtained; two separated transmitters could be utilized with a singlereceiver array; one receiver array can be used in different positions relative to one transmitter, to name a few. Strata information in two directions may be obtained by another orientation of the transmitter and receivers.

Although the present invention has been described with a certain degree of particularity, it is to be understood that various modifications may be made thereto in the light of the above teachings.

What is claimed is:

1. Signal processing apparatus for a transducer array, comprising:
   A. a signal-recording medium;
   B. a plurality of recording devices each for recording a signal derived from a respective transducer of said array, on a separate track of said recording medium;
   C. readout means;
   D. said recording medium being movable relative to said recording devices, and said readout means;
   E. said readout means including a plurality of linear transducer means,
      1. each said linear transducer means extending across, and being in signal transfer relationship with, all said tracks,
      2. each said linear transducer being positionable independently of said recording devices at an angle greater than 0° with respect to the direction of relative movement between said readout means and said recording medium,
      3. at least two of said linear transducers being at an angle greater than 0° with respect to each other.

2. Apparatus according to claim 1 wherein at least one linear transducer means of the readout means comprises a single transducer extending across all the tracks.

3. Apparatus according to claim 1 wherein the roles of the recording devices and readout means are interchanged and the recording devices each provide a signal to a respective transducer of the array.

4. Apparatus according to claim 1 wherein the recording medium is a magnetic tape and the recording devices are magentic recording heads.

5. Apparatus according to claim 1 which additionally includes means for varying the orientation of the recording devices with respect to the readout means.

6. Apparatus according to claim 1 which additionally includes means for tilting the array of recording devices with respect to the direction of travel of the signal-recording medium.

7. Apparatus according to claim 1 which additionally includes means for adjustably aligning the recording devices along a curved line to compensate for curvature of the transducer array.

8. Apparatus according to claim 1 wherein the spacing between the recording devices is proportional to the spacing between transducers of the array.

9. Apparatus according to claim 1 which additionally includes means for rotating the readout means.